P. C. McEWEN & F. W. YOUNG.
HERNIAL TRUSS PAD.
APPLICATION FILED JUNE 19, 1911.
1,023,435.
Patented Apr. 16, 1912.
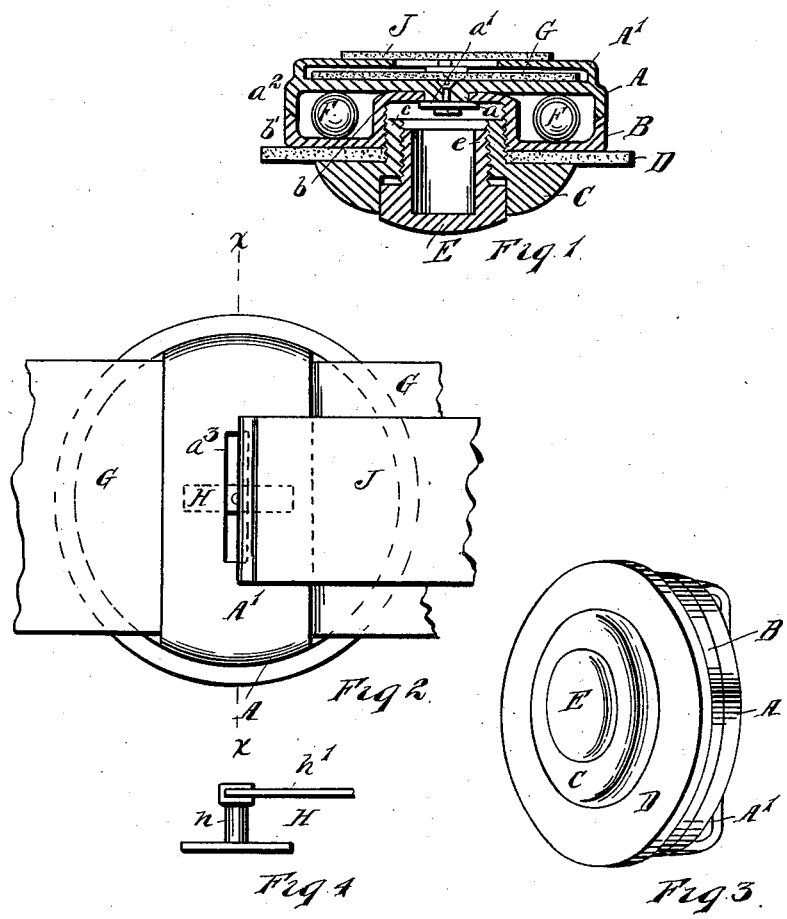

UNITED STATES PATENT OFFICE.

PETER C. McEWEN AND FREDERICK W. YOUNG, OF DETROIT, MICHIGAN.

HERNIAL TRUSS-PAD.

1,023,435.  Specification of Letters Patent.  Patented Apr. 16, 1912.

Application filed June 19, 1911. Serial No. 634,142.

*To all whom it may concern:*

Be it known that we, Peter C. McEwen and Frederick W. Young, citizens of the United States, residing at Detroit, county of Wayne, State of Michigan, have invented a certain new and useful Improvement in Hernial Truss-Pads, and declare the following to be a full, clear, and exact description of the same, such as will enable others skilled in the art to which it pertains to make and use the same, reference being had to the accompanying drawings, which form a part of this specification.

Our invention consists of the peculiar construction and combination in hernial truss pads as hereinafter described and claimed.

In the drawings:—Figure 1, is a section of the pad on the line X—X of Fig. 2. Fig. 2, is a back view of the pad. Fig. 3, is a perspective view of the pad. Fig. 4, is a figure of a detail partly shown in Fig. 2.

In all drawings, similar letters refer to similar parts.

In the drawings, A, is the base of the pad having a raised bar A′ running from side to side vertically.

B, is a counterpart to A in diameter having a reëntering cup $b$ and by means of which it is revolubly attached to the base of A at $a$ by bolt $a'$.

Both A and B have circumferentially raised edges $a^2$, $b'$, which practically closely meet but are not necessarily in direct contact. Between the interior elevation $b$ of B and the cup formed by the raised edges $a^2$, $b'$ of the parts A and B is an annular recess in which are inserted balls for a ball bearing and as the two cup-formed pieces are held in contact with the balls, they easily rotate upon one another so that such rotation is resisted by the slighest amount of friction possible.

The interior face of the elevation $b$ of the part B is provided with screw threads. A hernial pad C has a projection $c$ central from its rear side, which projection is exteriorly threaded and is adapted to engage in the threads in the portion $b$ of the part B. The rounded projection of C extending laterally circumferentially forms a cap or flange and between it and the part B is inserted an annular felt washer D having an outside diameter somewhat greater than that of B; this felt washer is firmly held between the pad C and the part B by screwing the part C down upon it. The object of this felt pad is a moisture absorber as well as a protection from abrasion or any irritating effect of the part B upon the human body.

The walls $c$, $c$, are not only exteriorly threaded as already stated, but they are interiorly threaded also, and a center pad E is formed with a protection $e$ which being exteriorly threaded fits into the screw threaded part $c$ of the pad C and, by virtue of the screw threads thus engaging its elevation or projection beyond the face of the pad C can be adjusted at any desired limit.

G, is a strap attachment to the body passing underneath the elevated cross piece A′ and as it is not attached to the part A or A′ the pad, as a whole, can slide along this strap G, thereby preventing strain in changing positions of the human body.

In the cross piece A′ is cut a slot $a^3$ which is longitudinal with A′; a piece H having a shank $h$ and projecting cross bars $h'$ at right angles of the piece H (see Fig. 4) is formed for the application of a secondary or a thigh strap J, which engaging the part H′ may be used in any desired position except one that is absolutely vertical. The part H is passed through the slot $a^3$ and then turned at an angle as shown in dotted lines in Fig. 2 which turning prevents it coming out from the slot and yet leaves considerable freedom of movement not only rotatable but vertical, which freedom of movement is found quite desirable. Of course, it is plain that the thigh strap J may be reversed by turning the part H entirely around or attaching the strap J to the other side of it and thus the pad is adapted to be used upon either the right or left side as may be desired.

The operation of this device is quite simple, the part A being attached to the strap G is non-rotatable except to a limited degree, the part B being separated from the part A by means of the balls F, and held rotatably thereto by means of the separate bolt $a'$, it is extremely free to move rotatably and thereby readily accommodates itself to every shift of position without any rubbing or friction upon the person. The felt washer D not only absorbs any accumulation of moisture but cushions the contact to a very large extent, and the pad C and the adjustable center pad E afford means of adjustment of almost every required condition. It is obvious also that the parts of the whole structure can easily be disassociated for any necessary purpose.

Having thus described our invention, what we desire to claim is:—

1. A hernial pad consisting of a base plate, an annular ring concentric with and rotatably secured thereto, anti-friction balls separating the two, a hernial pad rotatably and concentrically adjusted with said annular ring, and a felt washer secured between the two, substantially as described.

2. A hernial pad consisting of a base plate, an annular ring concentric with and rotatably secured thereto, anti-friction balls separating the two, a hernial pad rotatably and concentrically adjusted with said annular ring, a felt washer secured between the two, and an adjustable center pad, substantially as described.

3. A hernial pad having in combination a base plate, an annular ring connected therewith and provided with a concentric cup member internally threaded, a pad having a threaded portion engaging the threads of the cup member, said threaded portion being also internally threaded, and a central pad having a threaded portion engaging the internal threads of said first mentioned threaded portion, substantially as described.

4. A hernial pad having in combination a base plate, an annular ring connected therewith and provided with a concentric cup member internally threaded, a pad having a threaded portion engaging the threads of the cup member, a felt member held between said pad and said annular ring and tightened or loosened by the threaded connection of the annular ring with the pad, and a central pad having a threaded portion engaging with internal threads of said first mentioned threaded portion, substantially as described.

5. A hernial pad having in combination a base plate provided with a raised annular flange, an annular ring rotatably connected therewith and provided with a concentric cup member internally threaded, and with a raised annular flange, anti-friction balls engaging in the annular recess formed by the cup members and the two annular flanges, and a pad having a threaded portion engaging the threads of the cup member, substantially as described.

It testimony whereof, we sign this specification in the presence of two witnesses.

PETER C. McEWEN.
FREDERICK W. YOUNG.

Witnesses:
VIRGINIA C. SPRATT,
R. A. PARKER.

---

Copies of this patent may be obtained for five cents each, by addressing the "Commissioner of Patents, Washington, D. C."